US010064327B2

(12) United States Patent
Conrad (10) Patent No.: US 10,064,327 B2
(45) Date of Patent: Sep. 4, 2018

(54) APPARATUS AND METHOD FOR MINIMIZING THE VOLUME OF A LIQUID CARRIER USED FOR DELIVERING AGRICULTURAL PRODUCTS INTO A FURROW DURING PLANTING

(71) Applicant: AMVAC Chemical Corporation, Newport Beach, CA (US)

(72) Inventor: Larry M. Conrad, Walker, IA (US)

(73) Assignee: AMVAC CHEMICAL CORPORATION, Newport Beach, CA (US)

( * ) Notice: Subject to any disclaimer, the term of this patent is extended or adjusted under 35 U.S.C. 154(b) by 90 days.

(21) Appl. No.: 15/190,652

(22) Filed: Jun. 23, 2016

(65) Prior Publication Data

US 2017/0000022 A1    Jan. 5, 2017

Related U.S. Application Data

(60) Provisional application No. 62/188,555, filed on Jul. 3, 2015.

(51) Int. Cl.
*A01C 5/06* (2006.01)
*A01C 7/06* (2006.01)
*A01C 23/04* (2006.01)

(52) U.S. Cl.
CPC ............ *A01C 23/047* (2013.01); *A01C 5/068* (2013.01); *A01C 7/06* (2013.01)

(58) Field of Classification Search
CPC ........... A01C 5/068; A01C 5/066; A01C 5/06; A01C 5/00; A01C 7/06; A01C 7/00; A01C 23/047; A01C 23/04; A01C 23/00
See application file for complete search history.

(56) References Cited

U.S. PATENT DOCUMENTS 2,533,374 A    12/1950 Hyland
2,794,407 A    6/1957 Wist et al.
5,092,255 A    3/1992 Long et al.
(Continued)

FOREIGN PATENT DOCUMENTS

WO    2014066664 A1    5/2014

OTHER PUBLICATIONS

International Search Report and Written Opinion for PCT/US2016/039659 dated Dec. 9, 2016, 17 pages.
(Continued)

*Primary Examiner* — Christopher J Novosad
(74) *Attorney, Agent, or Firm* — Lawrence N. Ginsberg (57) ABSTRACT

A method and apparatus for minimizing the volume of a liquid carrier used for delivering an agricultural product into a furrow during planting. In one embodiment, a spray nozzle is mounted on a planter row unit so as to dispense a carrier containing an agricultural product along a dispensing pattern in alignment with the pattern width of the spray nozzle, in the direction of the furrow. In one embodiment a seed cover assembly is operatively connected to a seed tube assembly. A seed cover application tube is mounted to the seed cover assembly. A seed cover brush is mounted to the outlet end of the seed cover application tube configured to contact the carrier containing the product during the dispensing thereof and brush the carrier containing the agricultural product onto the seed being dispensed from the seed tube assembly. In another embodiment, a seed firmer application tube assembly is utilized.

4 Claims, 9 Drawing Sheets

(56) References Cited

U.S. PATENT DOCUMENTS

| | | |
|---|---|---|
| 5,425,318 A | 6/1995 | Keeton |
| 5,673,638 A | 10/1997 | Keeton |
| 6,283,050 B1 | 9/2001 | Schaffert |
| 6,763,773 B2 | 7/2004 | Schaffert |
| 6,918,342 B2 | 7/2005 | Sauder et al. |
| 6,938,564 B2 | 9/2005 | Conrad et al. |
| 7,497,174 B2 | 3/2009 | Sauder et al. |
| 7,921,787 B2 | 4/2011 | Sauder et al. |
| 8,794,164 B2 | 8/2014 | Sauder et al. |
| 2004/0244658 A1 | 12/2004 | Conrad et al. |
| 2009/0158979 A1 | 6/2009 | Sauder et al. |
| 2010/0089296 A1 | 4/2010 | Reincke |
| 2014/0076215 A1 | 3/2014 | Peter |

OTHER PUBLICATIONS

Dennis R. Gardisser, Rope Wick Tips, Cooperative Extension Service, University of Arkansas, U.S. Department of Agriculture, and County Governments Cooperating, MP 229, undated.

FIG. 9

APPARATUS AND METHOD FOR MINIMIZING THE VOLUME OF A LIQUID CARRIER USED FOR DELIVERING AGRICULTURAL PRODUCTS INTO A FURROW DURING PLANTING

CROSS REFERENCE TO RELATED APPLICATIONS

This patent application claims the benefit of U.S. Provisional Application No. 62/188,555, filed Jul. 3, 2015, entitled APPARATUS AND METHOD FOR MINIMIZING THE VOLUME OF A LIQUID CARRIER USED FOR DELIVERING AGRICULTURAL PRODUCTS INTO A FURROW DURING PLANTING.

BACKGROUND OF THE INVENTION

1. Field of the Invention

The present invention relates generally to material delivery systems for agricultural products, including fertilizers, nutrients, crop protection chemicals, biologicals, plant growth regulators; and, more particularly to material dispensing systems for dispensing agricultural liquid products at relatively low rates.

2. Description of the Related Art

Most agricultural liquid products applied at planting are applied generally using water as the carrier, but other carriers may be used such as liquid fertilizers, at rates of the carrier above two gallons per acre. Applying the agricultural liquid products in the carrier at rates below two gallons per acre causes metering problems with the row planter unit that dispenses these agricultural liquid products. One issue is that dispensing agricultural liquid products in a carrier at these low rates requires a relatively small orifice for metering with a standard liquid dispensing system. The small orifice results in concomitant issues with plugging and limits the products that maybe applied at these low rates. The small orifices become more easily plugged by contaminates and particulates if a low rate of dispensing is involved.

Using selective applicators to control weeds growing above the crop has been widely adopted as a weed control method. Several types have been developed. Among them are recirculating sprayers, roller applicators, carpet wipers, and rope wick applicators of several designs. A discussion of rope wick applicators is in the publication "Rope Wick Tips", by Dennis R. Gardisser, Cooperative Extension Service, University of Arkansas, U.S. Department of Agriculture, and County Government Cooperating, Publication MP229, undated. A rope wick applicator works the way the name suggests. The chemical is wicked from a reservoir to the exposed portion of the rope. This exposed portion of rope is then wiped against the plant to be controlled.

There are several systems used on typical agricultural sprayers that pulse the liquid at three to twenty times a second. This range of pulse rate provides a high degree of control of application. For a given nozzle size and/or application rate the range of speed of travel is more limited if one is not pulsing the application of the agricultural product than if one is pulsing the application. By applying the principals of the present invention, as will be disclosed below, the amount of carrier to apply the pesticides, etc. at planting, can be reduced. The amount of agricultural product can also be reduced.

In some embodiments of the present invention, the spray nozzle of the dispensing system of the row planter unit is modified, as will be disclosed below, to provide a continuous line of agricultural liquid products. In other embodiments, where, what is known in this field as a seed firmer or rebounder is used, features are provided to work with such a low rate of dispensing. Seed firmers and rebounders are used to better place the seed in the bottom of the seed furrow or trench.

SUMMARY OF THE INVENTION

In one aspect, the present invention is embodied as a method for minimizing the volume of a liquid carrier used for delivering an agricultural product into a furrow during planting. A spray nozzle is mounted on a planter row unit so as to dispense a carrier containing an agricultural product along a dispensing pattern in alignment with the pattern width of the spray nozzle, in the direction of the furrow.

In another aspect, the present invention is embodied as an apparatus for minimizing the volume of a liquid carrier used for delivering a carrier containing an agricultural product into a furrow during planting. The apparatus includes a seed tube assembly for dispensing seed. A seed cover assembly is operatively connected to the seed tube assembly. A seed cover application tube is mounted to the seed cover assembly. The seed cover application tube assembly has an outlet end for dispensing a carrier containing an agricultural product. A seed cover brush is mounted to the outlet end of the seed cover application tube. The seed cover brush is configured to contact the carrier containing the agricultural product during the dispensing thereof and brush the carrier containing the agricultural product onto the seed being dispensed from the seed tube assembly.

In another embodiment the apparatus for minimizing the volume of a liquid carrier used for delivering a carrier containing an agricultural product into a furrow during planting includes a seed firmer application tube assembly mounted to said seed firmer assembly. The seed firmer application tube assembly has an outlet end for dispensing a carrier containing an agricultural product.

The application rate range of the present invention provides for a convenient package for handling and shipping. The containers may be made smaller and lighter than presently used containers. Manufacturing and shipping costs are therefore reduced. Furthermore, there is less volume of agricultural product required, resulting in reduced storage and handling requirements.

In some embodiments the agricultural product containers are rigid. In some embodiments the agricultural product containers may be disposable.

DETAILED DESCRIPTION OF THE INVENTION

Figure 1:
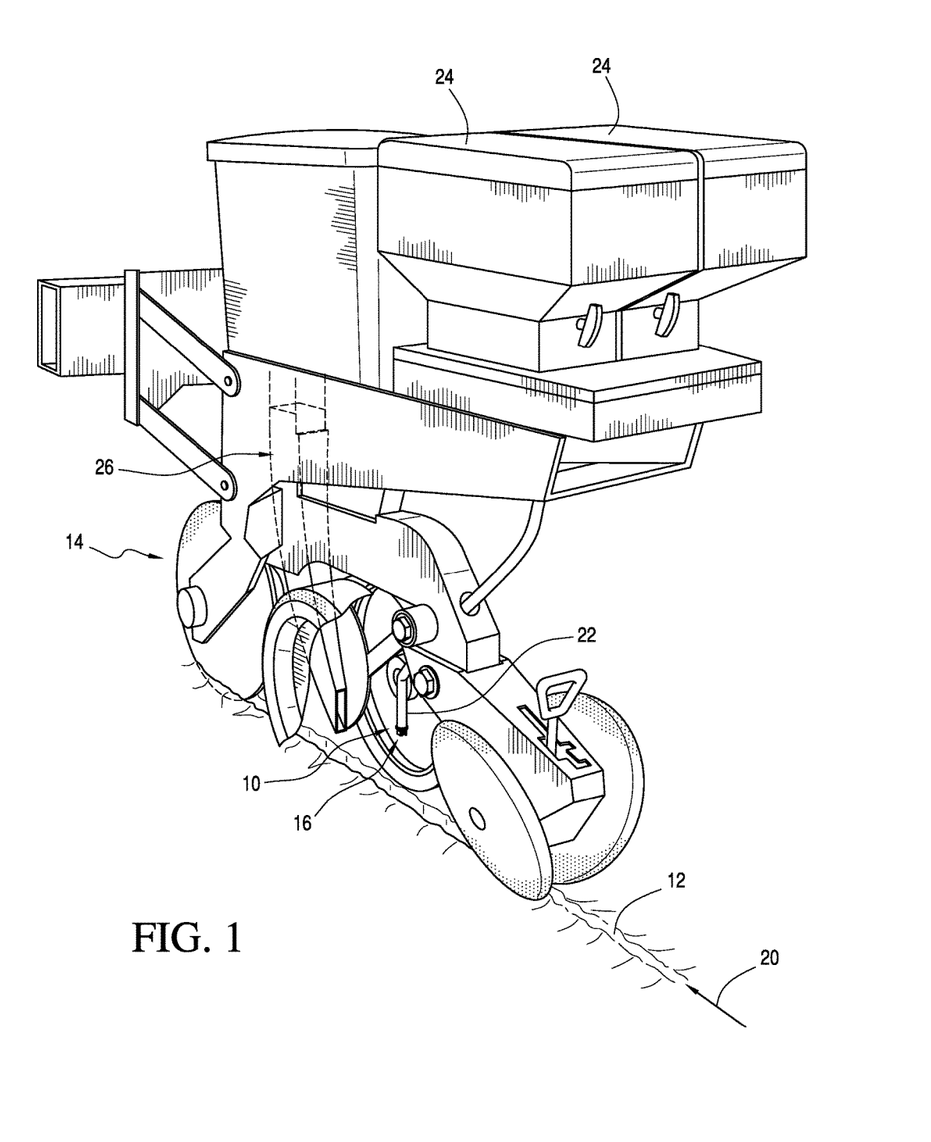
FIG. 1 illustrates an apparatus for minimizing the volume of a liquid carrier used for delivering an agricultural product into a furrow, from a planter row unit, during planting in accordance with the principles of the present invention, in which a spray nozzle is mounted so as to dispense an agricultural product along a dispensing pattern in alignment with the pattern width of the spray nozzle, in the direction of the furrow.
Figure 2:
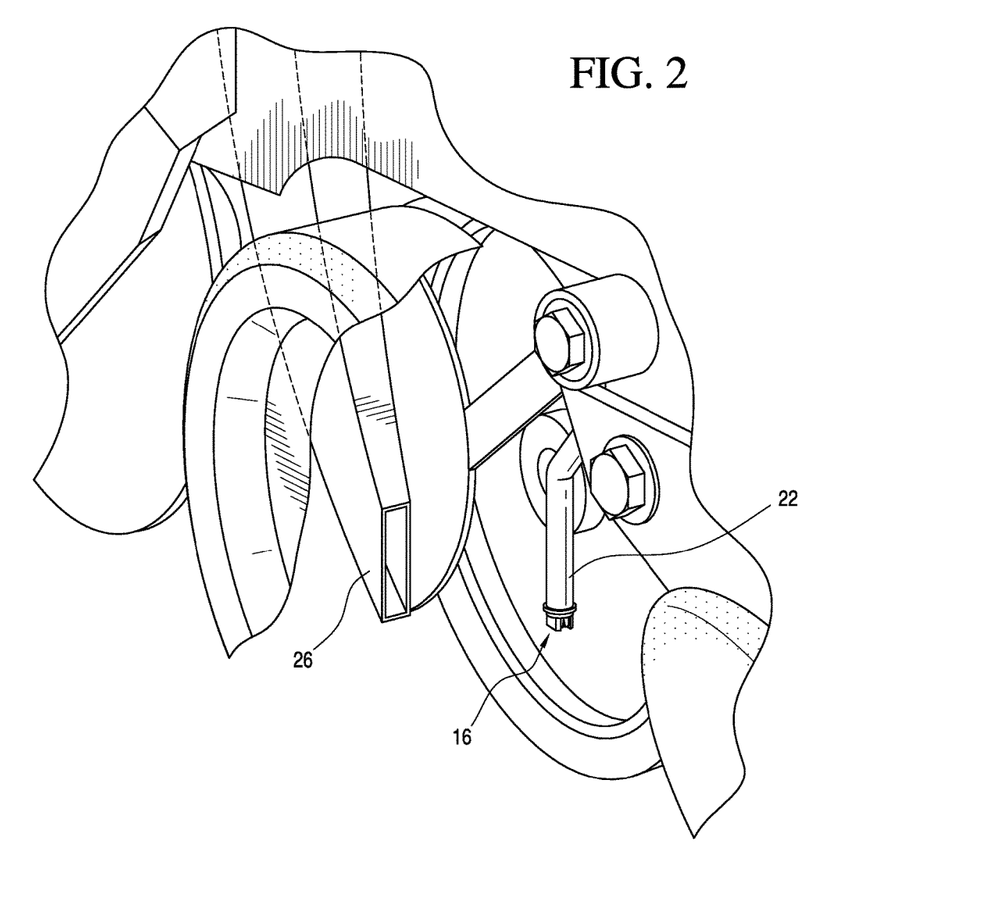
FIG. 2 is an enlarged perspective illustration of a portion of the planter row unit of FIG. 1, showing the orientation of the spray nozzle to dispense along a dispensing pattern in alignment with the pattern width, in the direction of the furrow.
Figure 3:
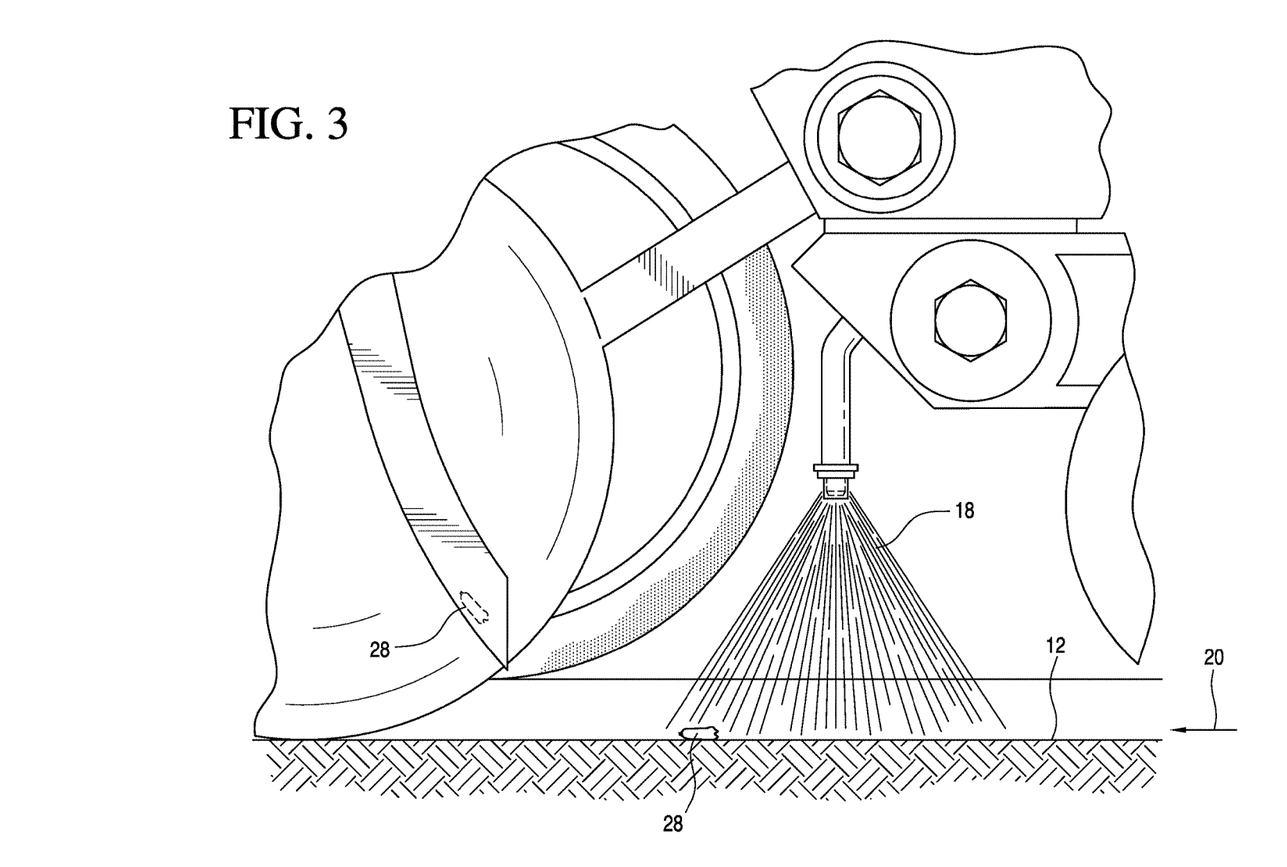
FIG. 3 is a schematic side view of the system shown in FIG. 1, in operation.
Figure 4:
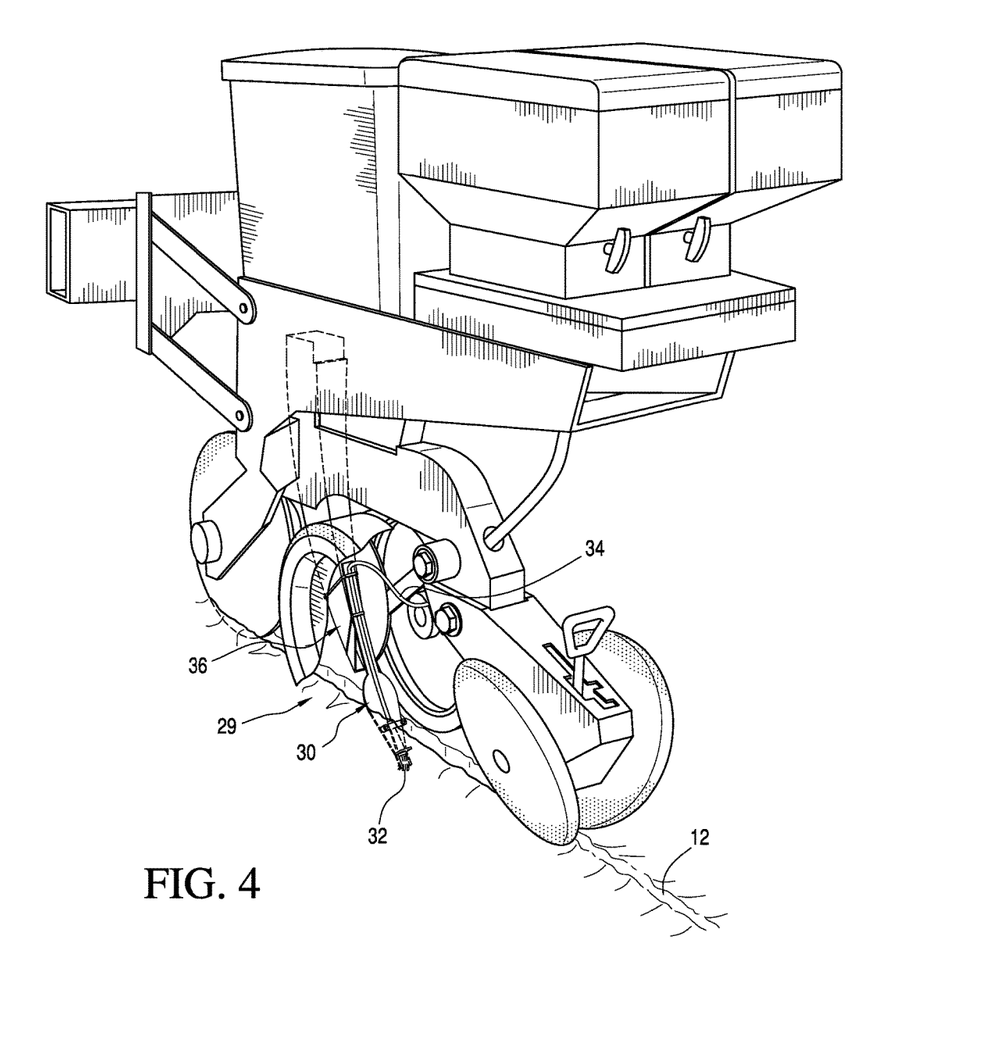
FIG. 4 illustrates a second embodiment of an apparatus for minimizing the volume of a liquid carrier used for delivering an agricultural product onto a seed in the furrow during planting, in which a seed cover assembly is used with a seed cover brush mounted to the outlet end of a seed cover application tube, the seed cover brush being configured to contact the agricultural product during the dispensing thereof and brushing the agricultural product onto the seed being dispensed from a seed tube assembly.
Figure 5:
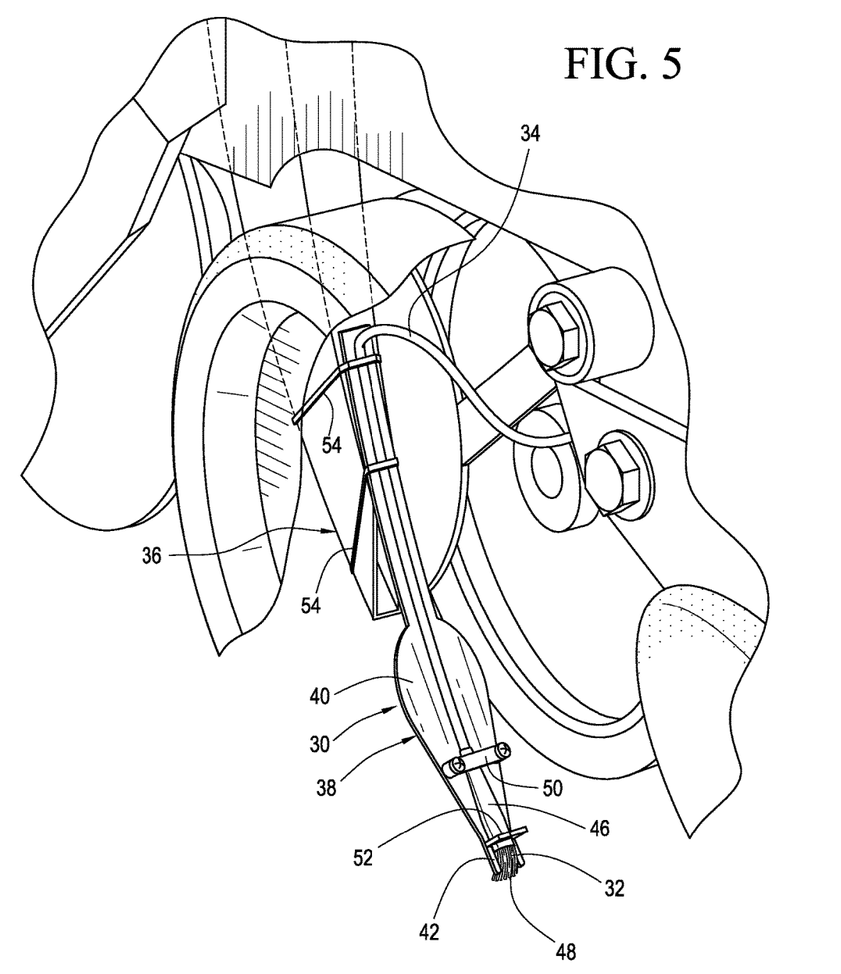
FIG. 5 is an enlarged perspective illustration of a portion of the planter row unit of FIG. 4, showing details of the seed cover assembly and seed cover brush.
Figure 6:
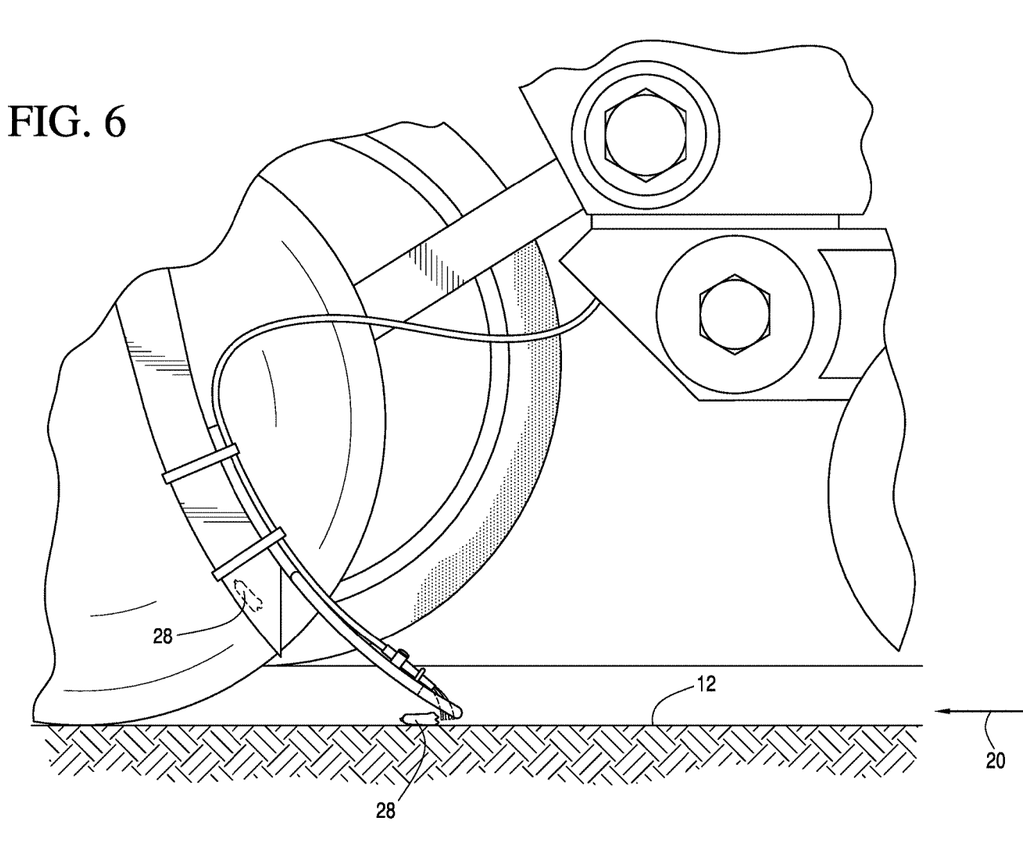
FIG. 6 is a schematic side view of the system shown in FIG. 4, in operation.

Referring now to the drawings and the characters of reference marked thereon, FIGS. 1-3 illustrate an apparatus, designated generally as 10 in FIG. 1, for minimizing the volume of a liquid carrier used for delivering an agricultural product into a furrow 12, from a planter row unit 14, during planting in accordance with the principles of the present invention.

The planter row unit 14 may be, for example, such as manufactured by John Deere & Company, CNH America LLC, Kinze Manufacturing, Precision Planting LLC, as is known by those in this field.

Typical liquid carriers may be, water and/or liquid fertilizer. A spray nozzle 16 is mounted so as to dispense an agricultural product 18 (see FIG. 3) along a dispensing pattern in alignment with the pattern width of the spray nozzle 16, in the direction 20 of the furrow 12.

The spray nozzle 16 may be, for example, a flat fan spray tip type. Such a flat fan spray tip type is distributed by companies like DG TeeJet, as the DG TeeJet® Drift Guard Even Flat Spray Tip. Conventionally, when a flat fan spray tip type is utilized the tip is oriented so that it provides application in a broadcast fashion, i.e. the liquid is distributed in a line substantially perpendicular to the direction 20 of the furrow 12. However, with the present invention, as can be best seen in FIG. 2, the spray nozzle 16 is oriented so that application is provided in the direction 20 of the furrow 12.

The planter row unit 14 is operated to deliver the carrier containing the agricultural product in a pulsed manner. The goal is to synchronize the pulsing with the geometry of the row unit, e.g. the distance of the nozzle from the ground, etc., so that the planter row unit delivers the carrier containing the agricultural product in a substantially continuous line of agricultural product in the furrow. The pulsed rate is generally in a range of between about 3 to 20 times per second. Since the bandwidth is in the direction of travel of the planter row unit 14, for a continuous pattern flow, with the same size tip as a conventional system, flow is required generally every 6-10 inches rather than the ½ to 1 inch required to provide a continuous application at a lower rate of application. Thus, the dispensing pattern is generally a strip in a range of between 6 and 10 inches.

The spray nozzle 16 is attached to a liquid dispensing line 22 in fluid communication with one or more containers 24 supported in the planter row unit 14.

The material dispensing system of the present invention may be used with other types of agricultural implements, but is primarily used with seed planting equipment 26. Although FIGS. 1 and 3 show a single row of planting equipment, typical planters include multiple rows, for example, up to 48 or more.

As can be seen in FIG. 3, just after the seed 28 is dispensed in the furrow 12, the agricultural product is dispensed into the furrow 12.

Referring now to FIGS. 4-6, in a second embodiment of an apparatus for minimizing the volume of a liquid carrier used for delivering an agricultural product onto a seed in the furrow during planting, is illustrated, and designated generally as 29. In this embodiment of a seed cover assembly 30 is used with a seed cover brush 32 mounted to the outlet end of a seed cover application tube 34. The seed cover brush is configured to contact the agricultural product during the dispensing thereof, brushing the agricultural product onto the seed being dispensed from a seed tube assembly 36.

One example of a seed cover for a seed cover assembly 30 is known in this field as the Rebounder™ seed cover, manufactured by Schaffert Mfg. Co., Inc., 105 D Street Hwy 6 & 34 Indianola, Nebr. The Rebounder™ seed cover is a planting attachment that improves the accuracy and uniformity of in-furrow seed placement on planters and seed drills.

The seed cover 38 of the seed cover assembly 30 includes a wedge-shaped portion 40 for guiding the seed to a furrow 12. This seed cover assembly 30 is known as a "rebounder" because the seed is "rebounded" to flow to a notched distal portion thereof. The notched distal portion serves as an outlet end for dispensing agricultural product flowing through the seed cover application tube 34.

The seed cover brush 32 is mounted to the outlet end of the seed cover application tube. The seed cover brush 32 is configured to contact the agricultural product and carrier during the dispensing thereof and brush the agricultural product and carrier onto the seed being dispensed from the seed tube assembly. The seed cover brush 32 may be formed by a metal clamp 46 attached to the end of the seed cover application tube 34, with seed cover brush bristles 48 crimped by the metal clamp 46. Therefore, the seed cover brush bristles 48 become saturated with the liquid agricultural product and carrier as it exits the notched distal portion 42. Thus, the seed cover brush 32 essentially paints the seeds 28 as they brush against the bristles, as shown in FIG. 6. The seed cover brush is constructed of material that minimizes interference with the placement of the seeds and is substantially impervious to the agricultural products being applied. Various materials and dimensions of brushes may be used. It is preferably a ferrule style brush. By way of example, the brush width may be on the order of ¼ to ⅝ inches; the trim length may be on the order of ½ to ¾ inches; the length may be on the order of 3¼ to 5¾ inches. Ferule style brushes are manufactured by, for example, Felton Brushes. The bristles are preferably nylon.

The seed cover brush 32 can be secured to the seed cover assembly 30 by a bracket 50 and tab 52 with opening. The seed cover assembly 30 may be secured to the seed tube assembly 36 by ties 54.

Figure 7:
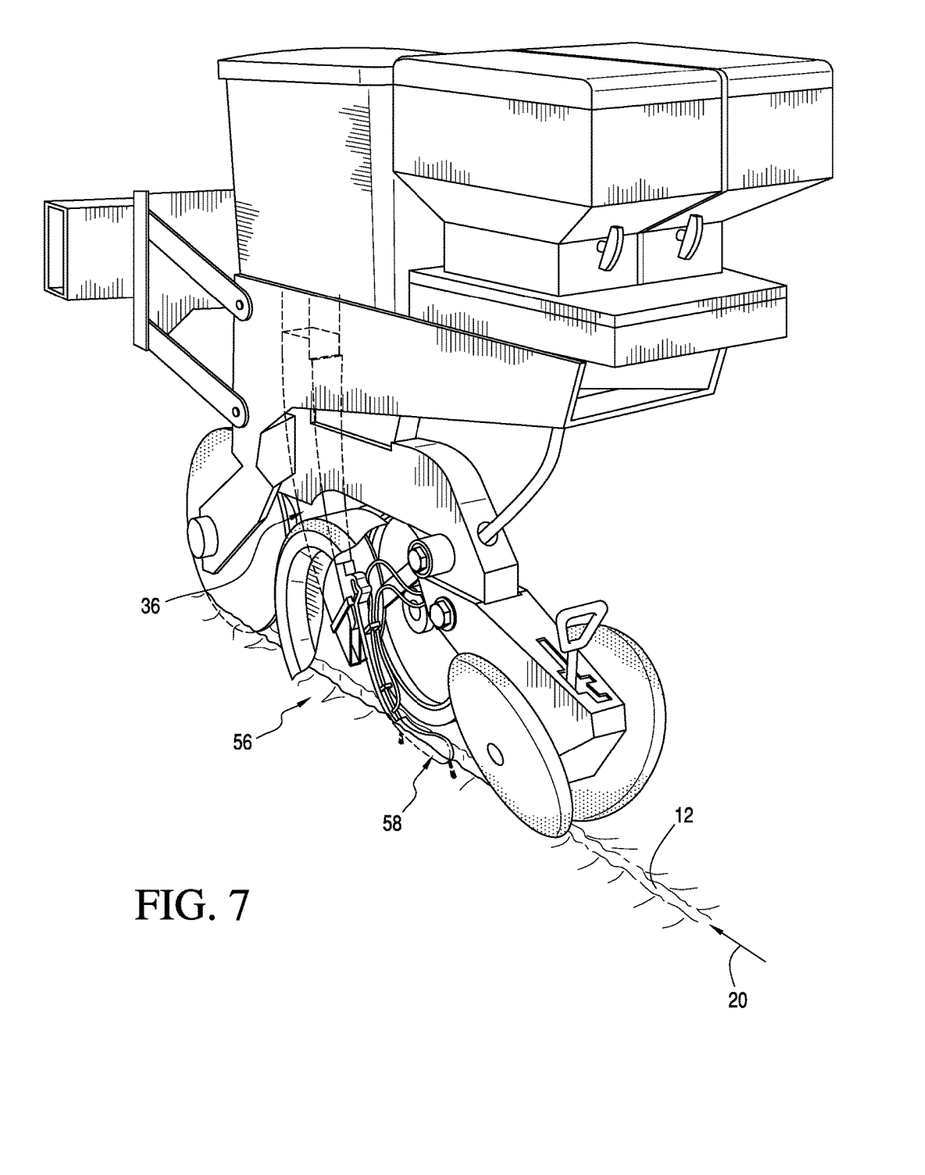
FIG. 7 illustrates a third embodiment of an apparatus for minimizing the volume of a liquid carrier used for delivering an agricultural product onto a seed in the furrow during planting, in which a seed firmer assembly is used with a seed firmer brush mounted to the outlet end of a seed firmer application tube assembly, the seed firmer brush being configured to contact the agricultural product during the dispensing thereof and brushing the agricultural product onto the seed being dispensed from a seed tube assembly.
Figure 8:
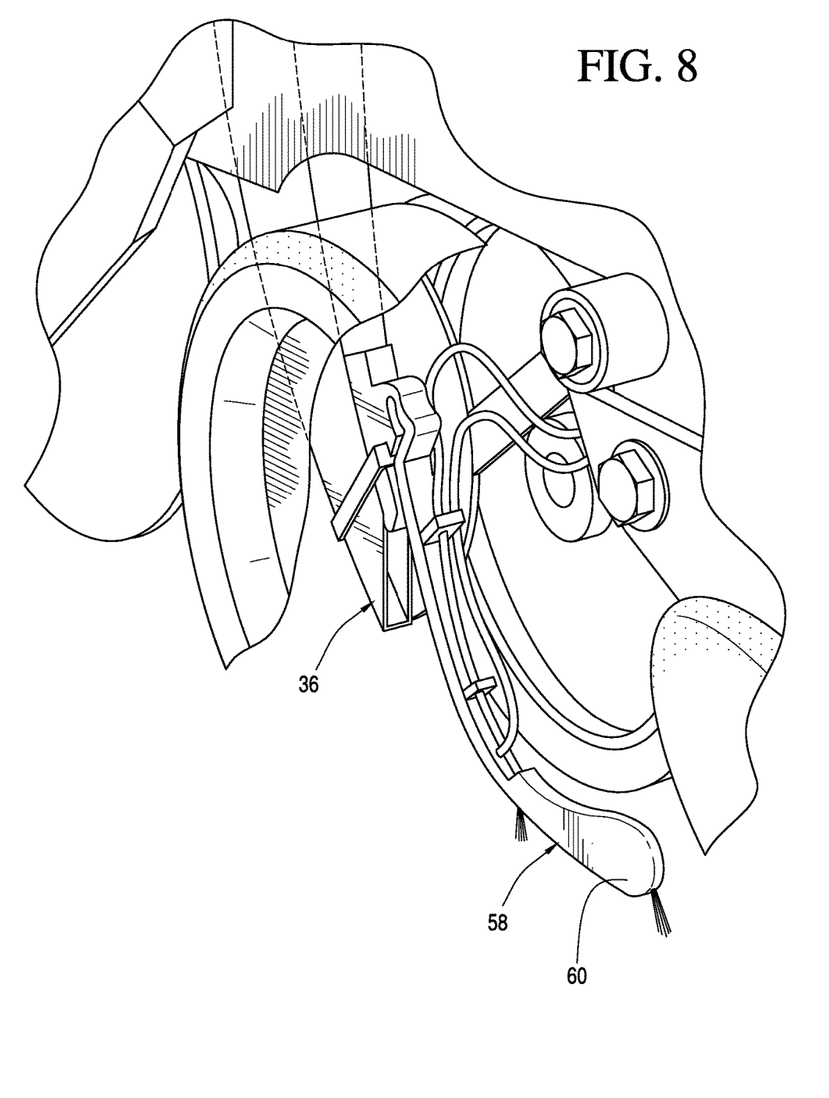
FIG. 8 is an enlarged perspective illustration of a portion of the planter row unit of FIG. 7, showing details of the seed firmer assembly and seed firmer brush.
Figure 9:
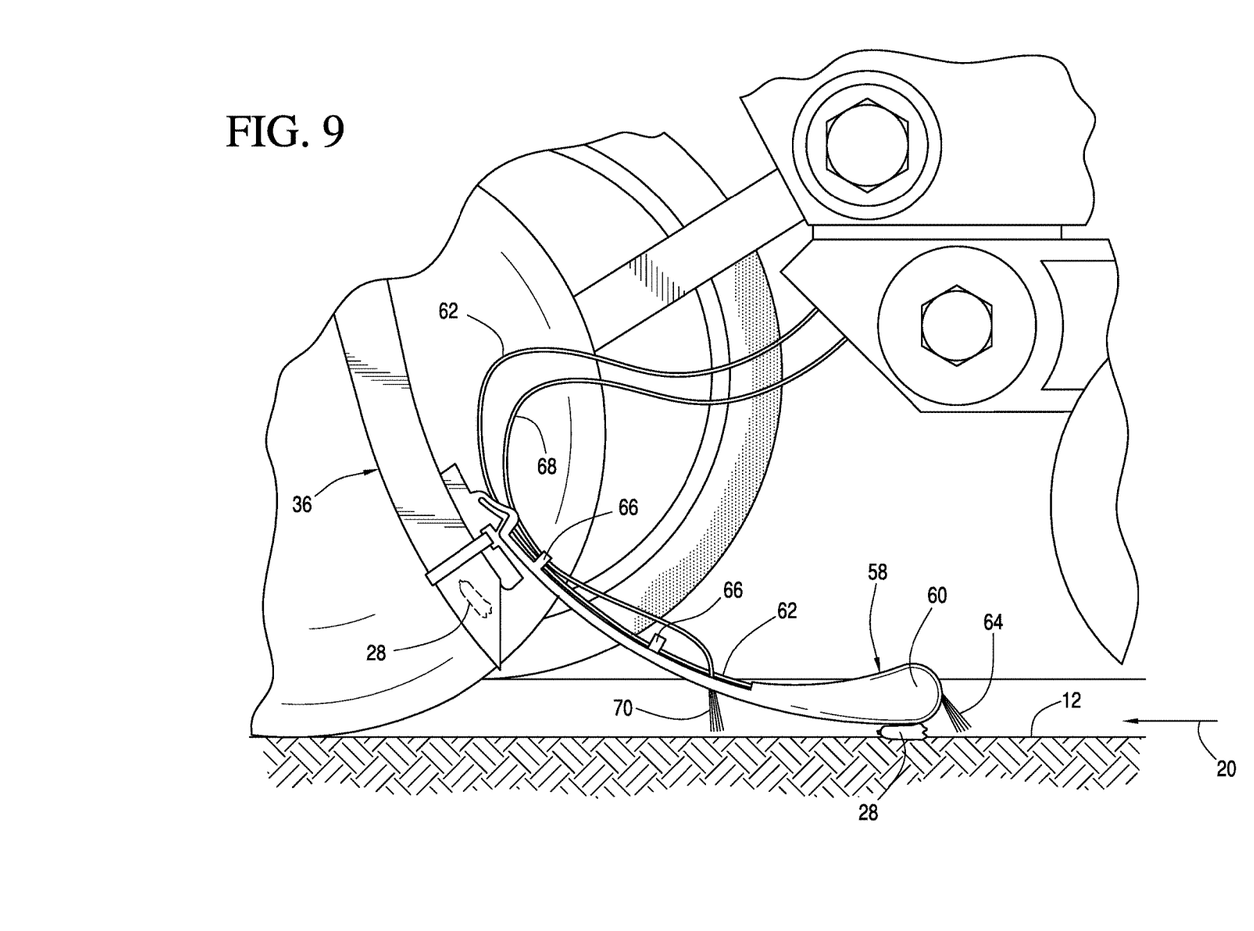
FIG. 9 is a schematic side view of the system shown in FIG. 7, in operation.

Referring now to FIGS. 7-9 another embodiment is illustrated, designated generally as 56. In this embodiment, instead of a seed cover assembly, a seed firmer assembly 58 is used in the apparatus 56 for minimizing the volume of a liquid carrier used for delivering an agricultural product onto a seed in the furrow during planting.

The seed firmer assembly 58 is operatively connected to a seed tube assembly 36. The distal end 60 of the seed firmer assembly 58 serves to force the seed 28 into the bottom of the furrow 12. A seed firmer application tube assembly 62 is mounted to the seed firmer assembly 58. The seed firmer application tube assembly 62 has an outlet end for dispensing the carrier and the agricultural product. A seed firmer brush 64 is mounted to the outlet end of the seed firmer application tube 62. The seed firmer brush 64 is configured to contact the carrier and the agricultural product during the dispensing thereof and brushing the carrier containing the agricultural product onto the seed 28 being dispensed from the seed tube assembly 36. As in the previous embodiment, suitable clamps 66 can be used to hold the seed firmer application tube 62 in place. The seed firmer brush extends from an opening in the distal end 60 of the seed firmer assembly 58. The seed firmer brush may be as described above relative to the seed cover brush.

If more than one liquid agricultural product is desired to be applied, additional seed firmer application tube assemblies 68 and associated seed firmer brushes 70 mounted thereon can be used. This could be in the instance where there are incompatible products thus allowing independent application. One example of such independent application would be the use of both biological and a chemical agricultural product.

As mentioned above, other embodiments and configurations may be devised without departing from the spirit of the invention and the scope of the appended claims.

The invention claimed is:

1. An apparatus for minimizing the volume of a liquid carrier used for delivering a carrier containing an agricultural product into a furrow during planting, comprising a) a seed tube assembly for dispensing seed;

b) a seed cover assembly operatively connected to said seed tube assembly;

c) a seed cover application tube mounted to said seed cover assembly, said seed cover application tube assembly having an outlet end for dispensing a carrier containing an agricultural product; and, d) a seed cover brush mounted to the outlet end of the seed cover application tube, said seed cover brush configured to contact the carrier containing the agricultural product during the dispensing thereof and brush the carrier containing the agricultural product onto the seed being dispensed from the seed tube assembly.

2. The apparatus of claim 1 wherein said seed cover assembly comprises notched distal portion.

3. The apparatus of claim 1 wherein said seed cover assembly comprises a wedge-shaped portion.

4. The apparatus of claim 1 wherein said seed cover brush is mounted to said seed cover application tube by a clamp.

* * * * *